United States Patent [19]

Conrad et al.

[11] Patent Number: 4,692,813
[45] Date of Patent: Sep. 8, 1987

[54] APPARATUS FOR CONVERTING RADIATION IMAGE INFORMATION CARRIED BY A STORAGE LAYER INTO A TELEVISION SIGNAL SEQUENCE

[75] Inventors: Bernhard Conrad, Erlangen; Guenther Tressl, Bubenreuth, both of Fed. Rep. of Germany

[73] Assignee: Siemens Aktiengesellschaft, Berlin and Munich, Fed. Rep. of Germany

[21] Appl. No.: 777,438

[22] Filed: Sep. 18, 1985

[30] Foreign Application Priority Data

Sep. 26, 1984 [DE] Fed. Rep. of Germany ....... 3435315

[51] Int. Cl.[4] .............................................. H04N 1/06
[52] U.S. Cl. ................... 358/294; 250/327.2; 358/111; 358/290; 358/901; 358/903
[58] Field of Search ............... 358/111, 290, 294, 903, 358/901; 250/327.2

[56] References Cited

U.S. PATENT DOCUMENTS

| | | | |
|---|---|---|---|
| 2,800,527 | 7/1957 | Artzt | 358/290 |
| 3,622,222 | 11/1971 | Remy | 358/290 |
| 3,859,527 | 1/1975 | Luckey | 250/327.2 |
| 3,875,587 | 4/1975 | Pugsley | 358/290 |
| 4,131,916 | 12/1978 | Landsman | 358/290 |
| 4,346,295 | 8/1982 | Tanaka et al. | 250/327.2 |
| 4,479,147 | 10/1984 | Rossini | 358/290 |
| 4,543,479 | 9/1985 | Kato | 250/327.2 |

FOREIGN PATENT DOCUMENTS

| | | |
|---|---|---|
| 0098574 | 7/1983 | European Pat. Off. . |
| 579826 | 4/1927 | Fed. Rep. of Germany . |
| 2044606 | 9/1969 | Fed. Rep. of Germany . |

OTHER PUBLICATIONS

"Computed Radiography Utilizing Scanning Laser Stimulated Luminescence," Sonoda et al., Radiology/Sep. 19, 1983, pp. 833–838.

*Primary Examiner*—Howard W. Britton
*Attorney, Agent, or Firm*—Hill, Van Santen, Steadman and Simpson

[57] ABSTRACT

An apparatus for converting radiation image information carried by a storage layer into a television pulse sequence has a drum with a surface on which the storage layer is disposed, a scanning light beam directed to said surface, the drum and the beam being rotatable relative to one another and axially displaceable for conducting a line scan and a change of line. The light signals thus acquired from said storage layer are supplied on an optical path to a photo-electric transducer. A fast and precise conversion of the radiation image information is achieved with the storage layer on the inside wall of the drum and the scan beam conducted via a deflection mirror disposed in the center of the drum, and with a lightguide for the optical connection between the scan surface of the layer and the transducer.

33 Claims, 15 Drawing Figures

FIG 1

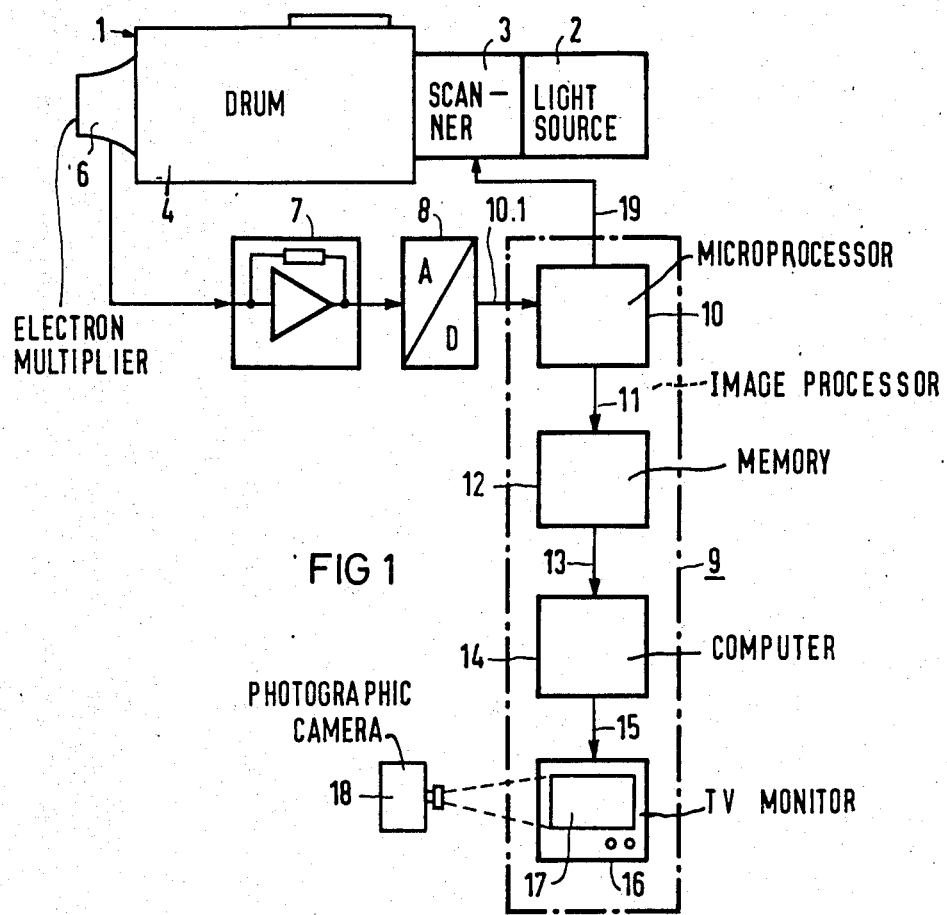
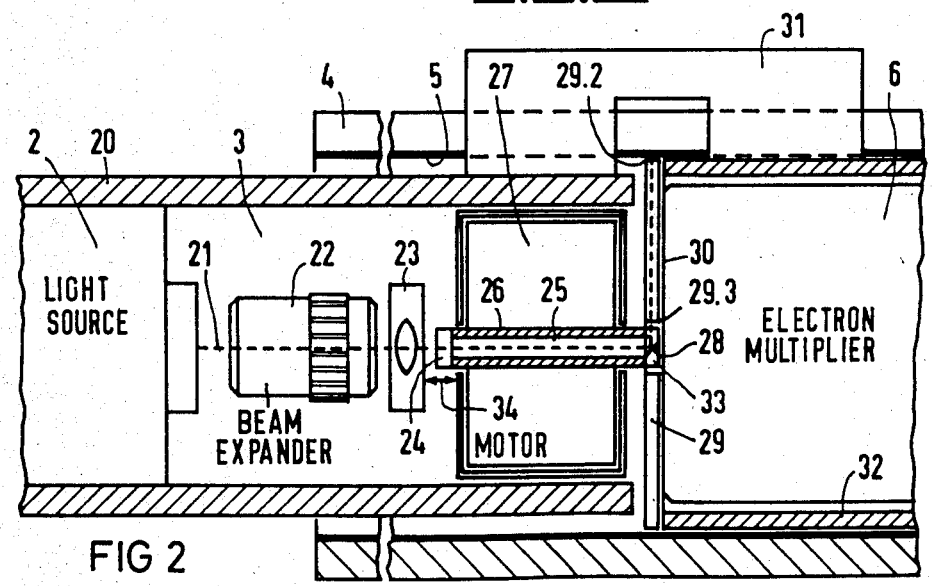

APPARATUS FOR CONVERTING RADIATION IMAGE INFORMATION CARRIED BY A STORAGE LAYER INTO A TELEVISION SIGNAL SEQUENCE

BACKGROUND OF THE INVENTION

1. Field of the Invention

The present invention relates to an apparatus for converting radiation image information carried by a storage layer into a television signal sequence, and in particular to such an apparatus usable in an X-ray diagnostics installation.

2. Description of the Prior Art

A device for converting image information contained in a storage layer into an electrical signal sequence, with the storage layer being disposed on the surface of a rotating drum is described in U.S. Letters Pat. No. 3,859,527. A scanning light radiator directed at the storage layer is provided, and the scanning beam and the drum are rotatable relative to each other and axially displaceable for conducting a line scan as well as a change of line. The scan surface is optically connected to a photo-electric transducer.

When recording radiation images, for example x-ray images, layers wherein the image information is stored as electrical charge distribution at a photo semiconductor layer or as excited locations of a phosphorescent material are, as known, employed in addition to photographically effective layers. A television signal sequence is then obtained therefrom by scanning the layer provided with the image information line-by-line by a focussed light beam. The former method is described in, for instance, "Journal of Applied Photographic Engineering 4:178-182 (1978)"; the second is disclosed in U.S. Letters Pat. No. 4,346,295 and in the afore-mentioned U.S. Letters Pat. No. 3,859,527. A description in the context of x-ray images is found on pages 833 through 838 of the periodical "Radiology" September 1983.

When, for instance, recording x-ray images in layers which contain a storage luminophore as the recording means, i.e. a phosphorescent material, a part of the light generated by the x-rays is stored. Given a format of, for example, 400×400 mm as is usually employed in x-ray diagnostics of the lung, the exposure plate proceeds into a read-out device after it has been radiated with x-rays. The exposure plate is scanned therein line-by-line with, for instance, a helium-neon laser beam (630 nm). Given employment of the barium fluorochloride bromide activated with europium (Eu) (BaF(ClBr):Eu) as the recording means, this leads to the emission of light centered at a wavelength of 390 nm. The light generated during this read-out is then supplied via a light-conducting system to a photomultiplier in which the television signal sequence is generated.

A problem in devices of the known type is that the probability for stimulation of the stored light by the laser beam is very slight. A reasonable read-out time for practical applications is possible when only a small part of the stored light is read-out because the laser beam then has to be situated on a pixel only for a short time. Enough light must nonetheless be read-out so that the number of electrons triggered in the photocathode of the photomultiplier is sufficiently high, for example, 10 electrons per absorbed x-ray quantum. The statistical fluctuations thus remain slight and have no harmful influence on the primary noise of the absorbed x-ray quanta. If a greater part of the stored light were read-out, then the majority of the stored light will be read-out in the center of the laser beam focus; the intensity of this stimulated light therefore decreases in this region, but far less in the further environment (scattered laser radiation). This would be harmful because the 3-dimensional resolution would be deteriorated due to this "bleeding".

Thus, only a small part of the stored light can be read-out and the intensity of the stimulated light decreases only slightly during the time in which the laser is situated on a pixel. The result is that the total quantity of light stimulated per pixel is approximately proportional to the read-out time. The required read-out time, in turn, is inversely proportional to the percentile light transfer from the storage luminescent layer to the photomultiplier needed to generate an adequate number of photoelectrons in the photocathode (considered as a step-by-step read-out, continuous in real time). Minimum read-out time thus requires maximum light transfer by the light-guiding system.

In a known apparatus, the planar surface of an exposure plate which is covered with a storage luminophore and contains an x-ray exposure is scanned with a laser beam. The stimulated light emerging from the scanned lines is then transferred by a lightguide to a photomultiplier. This transfer of the light from a scan line which, as already indicated above, should usually be about 400 mm long in x-ray exposures, onto a photomultiplier, whose input amounts to a maximum of 175 mm in a commercially available unit, is achieved by flexible lightguides and the like. Ultraviolet lightguides are preferable for the spectrum of the luminophore because the spectrum of the luminophore (spectrum of the stimulated light) extends down to 350 nm. A light transfer of a maximum of 5% of the light triggered in the luminophore onto the multiplier can then be estimated from the data for known lightguides of this type. The low percentage is attributed to the fact that such lightguides are composed of clad silica glass threads. Silica glass, however, has a low refractive index and the difference between the refractive index of the core of the conductor and that of its cladding is therefore slight. Such a conductor can therefore transmit light having an angle of incidence on the surface of the optical fibers which departs only slightly from the perpendicular (low numerical aperture).

A solid lightguide without cladding is employed according to U.S. Letters Pat. No. 4,346,295. Even so, higher light transfer can not be achieved because the guide is composed of synthetic material, for example, acrylic glass. Due to the lack of a cladding (i.e., a direct boundary with air), there is a high difference in refractive index, i.e., the numerical aperture is high. The spectral transmission, however, is low because of the great length required. A similar lightguide of silica glass would be extremely costly. The great length is needed because, given the light transmission from the 400 mm long line onto a photomultiplier having a significantly smaller diameter, a gradual transformation of cross-section is required (referred to as adiabatic light transmission).

A different design is disclosed in U.S. Letters Pat. No. 3,859,527 according to which the exposure plate is clamped to a rotating drum. Scanning is then undertaken by rotating the drum and directing a radial, axially advancing light beam thereon. A substantially complete light transfer from the point of the light emission to the photomultiplier is then possible because the focus of the laser beam on the storage luminophore layer is at rest relative to the photomultiplier and a short lightguide composed, for instance, of silica glass can therefore be employed. A disadvantage of this device is that the maximum rotational speed of the drum is limited due to the imbalance of clamped foils having a luminophore coating which is always somewhat different, which in turn limits the speed of the read-out. Even with respective balancing, the foils would be torn off by the centrifugal force given excessively high rotational speeds.

SUMMARY OF THE INVENTION

It is an object of the invention to provide an apparatus for undertaking fast and precise conversion of a radiation image information carried by a storage layer into a television signal sequence. By placing the storage layer at the inside wall of a mounting drum, the read-out time of 100 sec necessary in known devices given an area of 400×400 mm and 10 scan lines per mm can be reduced. Because the drum with the luminophore is not rotated, but only a small motor having the deflection mirror for the laser beam, the rotational speed of 2400 rpm which is possible in known devices can be increased by approximately an order of 10 without damage.

Moreover, more favorable light transfer from the luminophore onto the photomultiplier is possible with the use of storage layers wherein the storage ensues by means of a phosphorescing luminophore.

A round plate composed of transparent material such as acrylic glass or silica glass can be employed as the lightguide. The plate is disposed such that its lateral edges face the storage plate and such that one major face lies against the photomultiplier. Thus, over 40% of the stimulated light of the storage plate can be transferred onto the photocathode of the multiplier.

It is also possible within the concept disclosed herein to directly guide the scan beam onto the storage plate with the deflection mirror, for instance by seating the rotating mirror in front of the center of the plate. The mirror then only has to be inclined such that the scan beam reaches the storage surface passing by the lateral edge of the lightguide plate. Readout of the stored image signal is thus obtained in the proximity of the lateral wall of the lightguide plate, as in the embodiment wherein the scan beam is conducted through the lightguide plate.

Light input into the lightguide proceeding along the scan path of the storage plate can also be achieved by an appropriately inclined reflective ring. The reflected light must proceed onto the photocathode of the electron multiplier. A reliable transmission path is obtained by interposition of a lightguide. Preferably, this guide is in the shape of a cylinder having one end connected to the reflective ring and another end discharging at the photocathode of the electron multiplier.

Given employment of a light-transmissive drum as a mount for the storage film, such a lightguide can derive signals both at the inside and at the outside of the scan surface. Thus, light can be forwarded to the electron multiplier from both surfaces. The lightguide situated at the outside can also be employed for picking up image signals from an x-ray film, i.e., it can be used for picking up signal sequences from irradiatable images.

The required scanning along a helical path can be achieved by advancing the drum, or advancing the mirror and the lightguide (i.e., the lightguide plate), or advancing a lightguide cylinder.

Under conditions which are otherwise the same as in known arrangements, transfer of the light triggered at a storage layer improved by a factor of 10 can be achieved with the invention in comparison to the known apparatus. Thus, a read-out speed increased by 10 times is possible given conditions which are otherwise unaltered. A read-out time of 10 seconds is thus attainable with an arrangement of the invention. Such a read-out time is within the processing time required by standard x-ray film developing machines. Transfer of the light from a storage line 400 mm long onto a photocathode having, for example, a diameter of 125 mm requires long light paths given known illumination devices. The lightguide plate disclosed herein with lateral coupling therefor provides significant advantages. The 400 mm long line is then "wound up" with respect to the multiplier, so that short light paths, i.e., high efficiency and compact structure, are achieved (small, flat lightguide). The invention, thus, enables an economically justifiable use of storage luminophores in x-ray diagnostics.

DESCRIPTION OF THE DRAWINGS

FIG. 1 is a schematic circuit diagram of an apparatus for converting radiation image information into a television signal sequence constructed in accordance with the principles of the present invention.

FIG. 2 is a side sectional view of a portion of a first embodiment of an apparatus as shown in FIG. 1.

DESCRIPTION OF THE PREFERRED EMBODIMENTS

Figure 3:
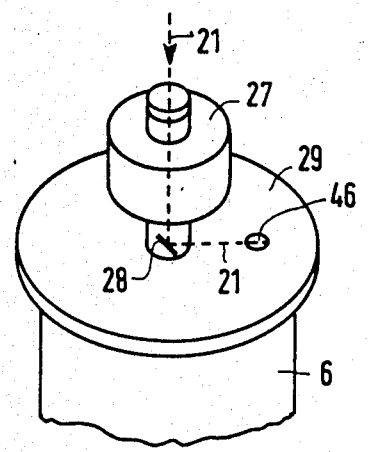
FIG. 3 is a perspective view of a portion of the device shown in FIG. 2.

In FIG. 1, an apparatus for converting stored image signals into television signals in accordance with the invention is generally referenced at 1. The apparatus 1 has a stimulating light source 2 which is conducted via a scanner 3 onto a film 5 (FIG. 2) secured in a drum 4 serving as storage plate. The light triggered or emitted there proceeds to an electron multiplier 6. Signals from the multiplier 6 proceed via an amplifier 7 and an analog-to-digital converter 8 into an image processor 9. The image processor 9 has a microprocessor 10 at the input of the line 10.1 from the analog-to-digital converter 8. The microprocessor 10 is connected via a line 11 to a memory 12 which in turn is connected via a line 13 to a computer 14. The image signals proceed from the computer 14 via a line 15 to a television monitor 16 and generate a visible image on the picture screen 17 thereof which can be viewed or, for instance, fixed with a camera 18. For synchronizing scanning of the storage layer of the film 5, a line 19 connects the microprocessor 10 and the scanner 3 of the apparatus 1.

A 30 mW helium-neon (He-Ne) laser is employed as light source 2. The laser is situated in a mounting tube 20 as shown in FIG. 2 and emits a beam 21 (shown as a broken line) to an expansion system 22 which expands the beam 21 having a 1 mm diameter to 4 mm. Subsequently, the beam 21 proceeds to a focussing means 23 which focusses the beam 21 onto the surface of the film 5 to be scanned. The beam 21 then proceeds through a cylindrical lens 24 for astigmatism correction. The beam 21 then proceeds through a longitudinal bore 25 of a shaft 26 of a motor 27 onto a deflecting mirror 28, and subsequently proceeds through an interior wall 29.3 of a lightguide plate 29 formed by a central hole in the plate 29, and out of its lateral wall 29.2 onto the surface of the film 5 to be scanned.

From there, stimulated or emitted light again proceeds via the lateral wall 29.2 of the plate 29 to the input window 30 of the electron multiplier 6. The plate 29 is a compact lightguide wherein the gaps normally existing between the fibers in a conventional lightguide composed of fibers are filled, so that it exhibits enhanced efficiency in comparison thereto. The multiplier 6 is rigidly connected by the mounting tube 30 and a flange 31 to the mounting tube 20 of the light source 2, so that a stable connection is established and longitudinal displacement of the drum 4 is still possible.

The scan beam 21 is expanded by the expansion system 22 from a diameter of 1 mm to 4 mm by a spatial filter, which is not separately shown.

Subsequently, the beam 21 is focussed in the means 23 so that it has a diameter of 30 μm when incident on the surface of the film 5.

The motor 27 is coupled to a coordinate generator (angle coder) which specifies the location (pixel number) within the line for the image read-out. The synchronizing line 19 from the microprocessor 10 to the light distributor 3 is present for this purpose. The deflection mirror 28 is embedded in a glass cylinder 33 which is glued to the lengthened shaft 26 of the motor 27. The cylinder 33 is nearly of the same size as the hole provided in the plate 29 for deflection of the beam 21. In a first approximation, therefore, astigmatism of the beam path of the scan beam is avoided. The residual astigmatism remaining due to the air gap is corrected by the low-refractive cylinder lens 24. The lens 24 is situated at the entry side of the scan beam into the bore 25 of the shaft of the motor. Under given conditions, this fine correction can also be displaceably mounted, as indicated by the double arrow 34.

Because the laser beam need not emerge precisely in the center of the light guide plate (about ±1.5 mm center deviation allowed, given a thickness of 5 mm), the mirror 28 need not be precisely adjusted. It is adequate to bond two bevelled blanks, whereby the bevelled surface of the one is previously polished, mirrored and provided with a protective layer. The blank produced in this fashion is subsequently fine-worked. Astigmatism arises due to the air gap, because the cylindrical curvature of the hole and of the reflective cylinder are somewhat different. Alternatively, a lightguide rod can be employed in any desired mount, the exit side of said rod having precisely the curvature of the hole; additional correction is then superfluous.

Even so, there is then still slight astigmatism, but this is not disturbing because it is adequate to focus the laser on the luminophore to a spot having a diameter of 50 μm.

Figure 6:
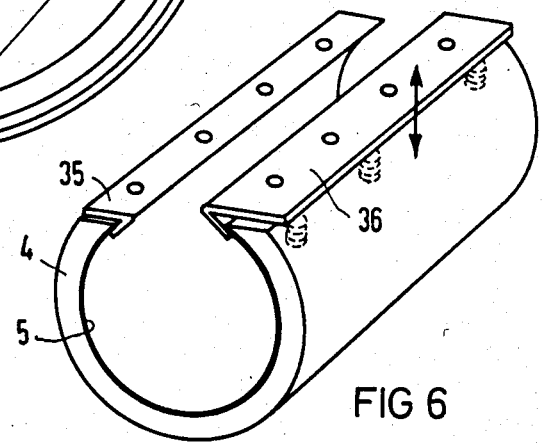
FIG. 6 is a perspective view showing mounting of the drum carrying the storage layer.

The lightguide plate 29 is preferably composed of silica glass because this is particularly good in conducting the light triggered at the film 5. The distance of the generated surface of the disk 29 from the surface of the film 5 amounts to 0.5 mm. The plate 29 has recesses at its outer periphery for the mounting flanges 35 and 36 (FIG. 6) of the drum 4.

Given a sufficiently small distance between the lateral edge of the plate 29 and the surface of the film 5, about 90% of the light triggered in the film enters into the plate 29. The light is completely transmitted therein by means of total reflection (refractive index in comparison to air greater than 1.42 as in plexiglass or silica glass). The remainder of 10% is due to reflection losses at the surface of the plate 29. In conventional devices of this type, light is transferred by a lightguide having a substantial longitudinal extent at its end onto the light receiver, for instance an electron multiplier. The lateral coupling of the plate 29 to the electron multiplier 6 in accord with the invention, however, results in total reflection cancellation at the side facing the multiplier given approximate coincidence of the refractive indexes of the adjoining parts. The light which is triggered in the film 5 thus reaches the receiver in the window 30 of the electron multiplier 6, i.e., the photocathode 37 (FIG. 4) of the electron multiplier 6, over very short paths.

Figure 4:
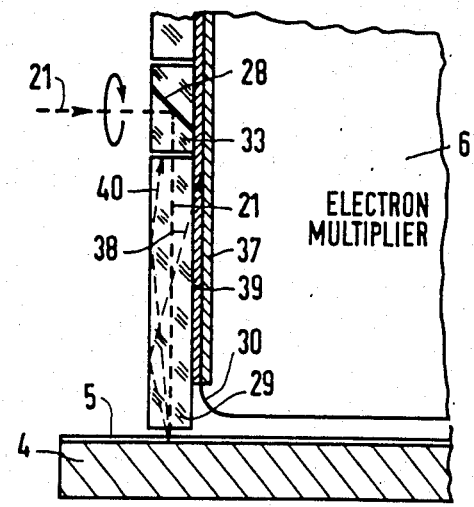
FIG. 4 is an enlarged sectional view of a portion of the device shown in FIG. 2.

In FIG. 4, the light path of the beam 21 is shown conducted through the plate 29. The beam 21 triggers light at the film 5 which then proceeds, for instance via the beam path 38, into the photocathode 37 of the electron multiplier 6. The beam thereby traverses a filter layer 39 which keeps light of the beam 21 which may have been scattered from proceeding into the photocathode 37. Laser light predominantly back-scattered from luminophore contributes to elevation of the pick-up signal and is therefore harmless. The beam 40 indicates the beam path which leads to the loss of light under unfavorable conditions.

Figure 5:
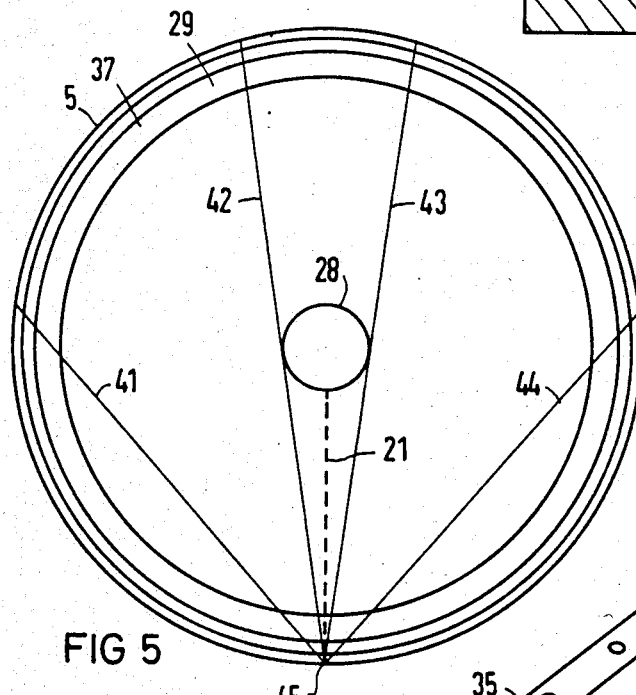
FIG. 5 is a plan view of the lightguide plate in the embodiment of FIG. 2.

FIG. 5 shows a plan view of the plate 29. It can be seen that the light paths, as indicated, for instance, by beams 41 through 44, can expand proceeding from a trigger point 45 over wide paths over the photocathode 37, so that a very efficient light transmission ensues. A maximum light spread of 42° is obtained symmetrically at both sides of the triggering beam 21, the light being refracted therein given a refractive index of n=1.5 of the lightguide plate 29.

Given a 144 mm diameter of the plate 29 and a thickness of 5 mm with a 20 mm diameter central hole for the deflecting mirror 28 and a photocathode of the electron multiplier 6 having a diameter of 125 mm, more than 95% of the light entering the plate 29 is transmitted onto the photocathode 37 of the electron multiplier 6. In the subject matter disclosed herein, thus, an approximately complete transmission of the light proceeding from the point 45 onto the photocathode having a 125 mm diameter is achieved over short light paths in a stable, compact arrangement.

The filter 39 may be a 2 mm thick plate of filter glass BG3 glued between the plate 29 and the window 30 of the electron multiplier 6. The filter 39 absorbs scattered light of the scan beam 21. A 3 mm thick filter which transmits 70% of the stimulated light triggered at 390 nm at the film 5 (given employment of BaFl (ClBr) as storage material) is employed in the usual coupling of the window 30 to the plate 29. The scan light of 630 nm, however, is absorbed up to less than the fraction $10^{-12}$. In the arrangement of the invention, the light paths in the filter are longer for the scan light and vary more greatly. Given a thickness of 2 mm for the filter 39, a transmission of roughly 50% of the light stimulated at the film 5 ensues given a transmittance for the scan light of the beam 21 as was already specified above. The arrangement of the invention, thus, has only 70% of the light transmission of an optimum, normal lightguide filter arrangement.

Figure 7:
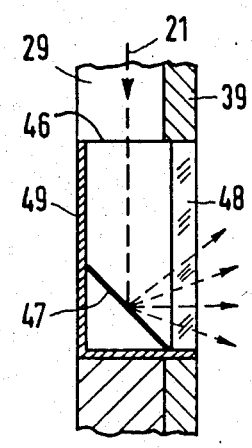
FIG. 7 is a sectional view of a calibration device in the apparatus shown in FIG. 3.
Figure 8:
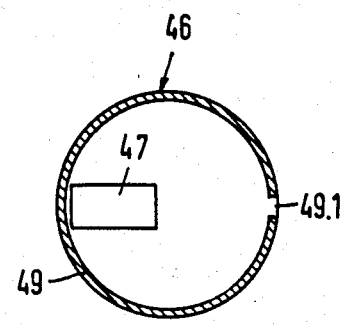
FIG. 8 is a plan view of the section shown in FIG. 7.

As shown in FIG. 3, a second hole 46 is provided in the lightguide plate 29 for establishing continuous calibration of the electron multiplier 6 and of the intensity of the laser wherein fluctuations appear in the timespan of several seconds which are important for producing an optimum image. As shown in detail in FIGS. 7 and 8, scan beam 21 is briefly guided through the second hole 46 to the photocathode 37 by a diffuse reflector 47 for generating a calibration pulse. The intensity of the beam 21 is reduced by a filter 48 of grey glass such that the pulse current roughly corresponds to the maximum current which can be generated by stimulated light proceeding from the film 5. The calibration opening 46 is shielded against stray light by an insert 49, being thus shielded laterally and at that side facing away from the electron multiplier 6. No stray light of the beam 21 can therefore proceed onto the reflector 47 of the calibration means during the read-out. During read-out of the opposite side, no light can proceed to the reflector via the remaining opening because this path is blocked by the deflection mirror 28.

Figure 9:
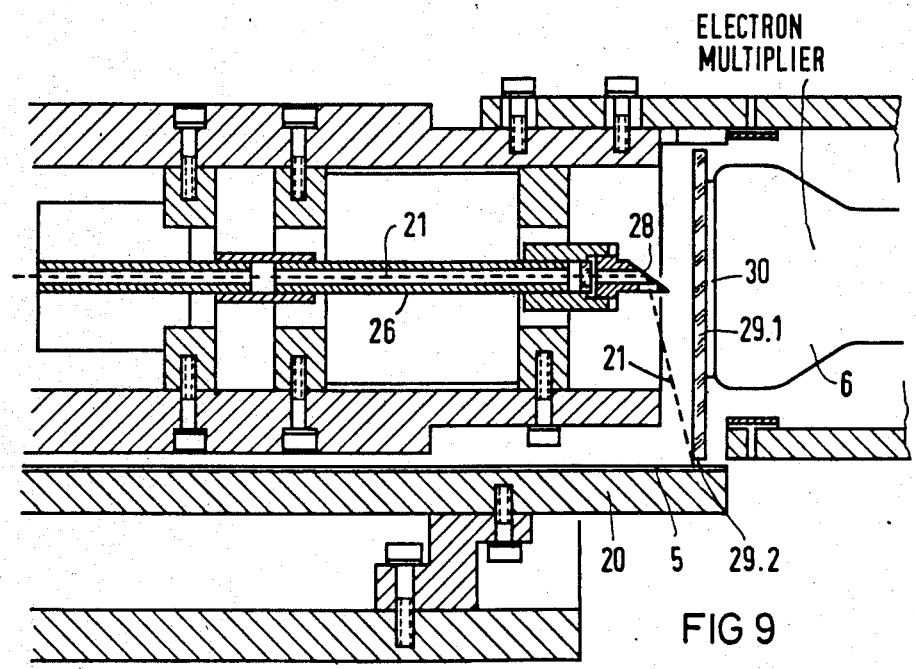
FIG. 9 is a side sectional view of a further embodiment of a portion of the apparatus shown in FIG. 1.

FIG. 9 shows a further embodiment using lightguide plate 29.1 without a central opening. The parts which coincide with those of FIG. 2 are indicated by the same reference numbers. The laser beam 21 is conducted to the mirror 28 such that it proceeds outside of the plate 29.1 and is conducted onto the luminophore of the film 5 past and extremely close to the outer edge 29.2 of the lightguide plate. An angle of about 10 to 20° exists between the laterally deflected beam 21.1 of FIG. 9 and the deflection of 90° selected in the arrangement of FIG. 2. Thus, despite adjustment tolerances, the focus in the luminophore of the film 5 is not situated in front of the lightguide plate 29.1. At least all light in the half space behind the perpendicular is directed into the lightguide 29.1. Given a thickness of the lightguide plate 29.1 of 5 mm, a distance of 1 through 2 mm from its lateral surface is preferred so that adjustment is not too critical. In this embodiment, the lightguide plate 29.1 need only be well-polished in all surfaces and need not be of optical quality material. It can, for example, be manufactured of silica glass which contains stria. In this embodiment, however, the light yield is lower than in the arrangements of FIGS. 1 through 5 because about half of the light triggered in the storage plate is lost due to the asymmetrical position of the plate relative to the originating point of the light.

Figure 10:
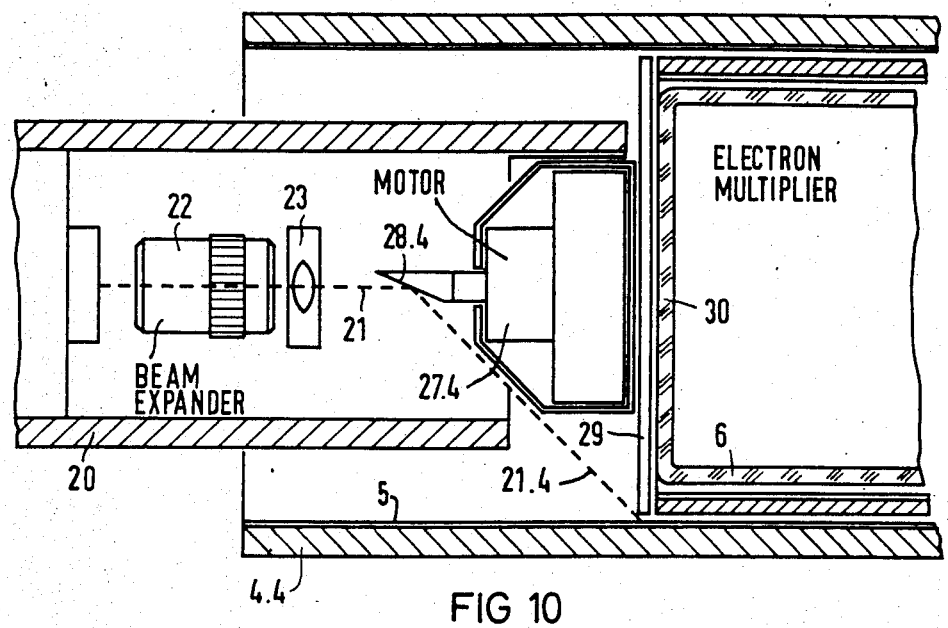
FIG. 10 is a side sectional view of an embodiment for use in the apparatus shown in FIG. 1 having a motor disposed between the mirror and the electron multiplier.

Another embodiment is shown in FIG. 10, wherein rotation of the mirror 28.4 ensues by a motor 27.4 which is disposed preceding the expansion system 22 and the focusing means 23. In this case, the motor 27.4 can be seated between the focusing means 23 and the electron multiplier 6 because the scan beam 21.4 can be conducted past the motor 27.4 laterally deflected.

Figure 11:
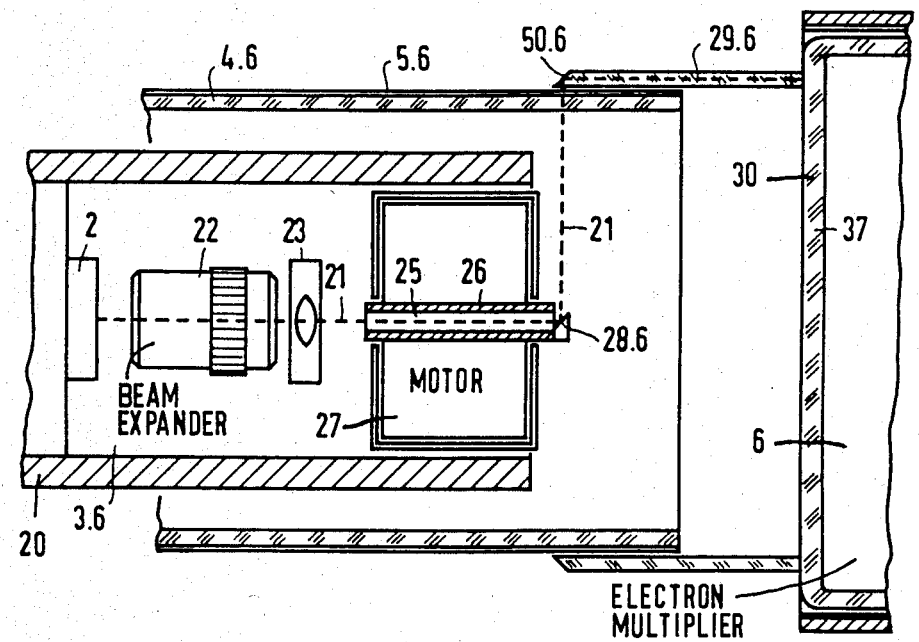
FIG. 11 is a side sectional view of an embodiment of a portion of the apparatus of FIG. 1 having a cylindrical lightguide.

FIG. 11 shows an embodiment of the invention with which an x-ray film 5.6 can be converted into a television pulse sequence. The mounting drum 4.6 is composed of transparent material such as glass. The film 5.6 can be cylindrically clamped without special mounting if it has sufficient mechanical stability. The light of the beam 21 incident through the drum 4.6 and the film 5.6 proceeds onto a reflective surface 50.6 which is placed around the film 5.6 at the outside so that it forms a conic section at an angle of 45° with the longitudinal axis. A tubular lightguide 29.6 composed of plexiglass is connected to the reflective surface 50.6, leading to the photocathode 37 of the electron multiplier 6.6. The lightguide 29.6 need not have optical precision. It is adequate if the guide 29.6 has well-polished surfaces. The reflective surface 50.6 also need not be exactly planar because light which deviates from the axial direction of the cylinder 29.6 and strikes its walls is forwarded by total reflection onto the photocathode 37 of the electron multiplier 6. The same is also true with respect to the divergency of the light ray beam 21, dependent on the focusing conditions and the diffraction phenomena of the laser beam at the film grains.

The reflective surface 50.6 can be replaced by a diffusely reflecting surface, for instance by a coating of titanium dioxide ($TiO_2$) which is bonded by epoxy resin. Such a layer results in over 50% of the light incident on the reflector being forwarded. A portion of the incident light re-emerges because the critical angle of the total internal reflection is not reached. Further losses due to total internal reflection which can occur at that end of the lightguide 29.6 facing the electron multiplier 6 are avoided by gluing this end to the entry window 30 of the electron multiplier 6. The light spreads wide laterally due to diffuse reflection and illuminates the photocathode 37 almost uniformly. Image artifacts due to local damage (scratches, dust, etc.) of the lightguide 29.6 and due to local irregularities of the photocathode 37 are thus avoided.

Figure 12:
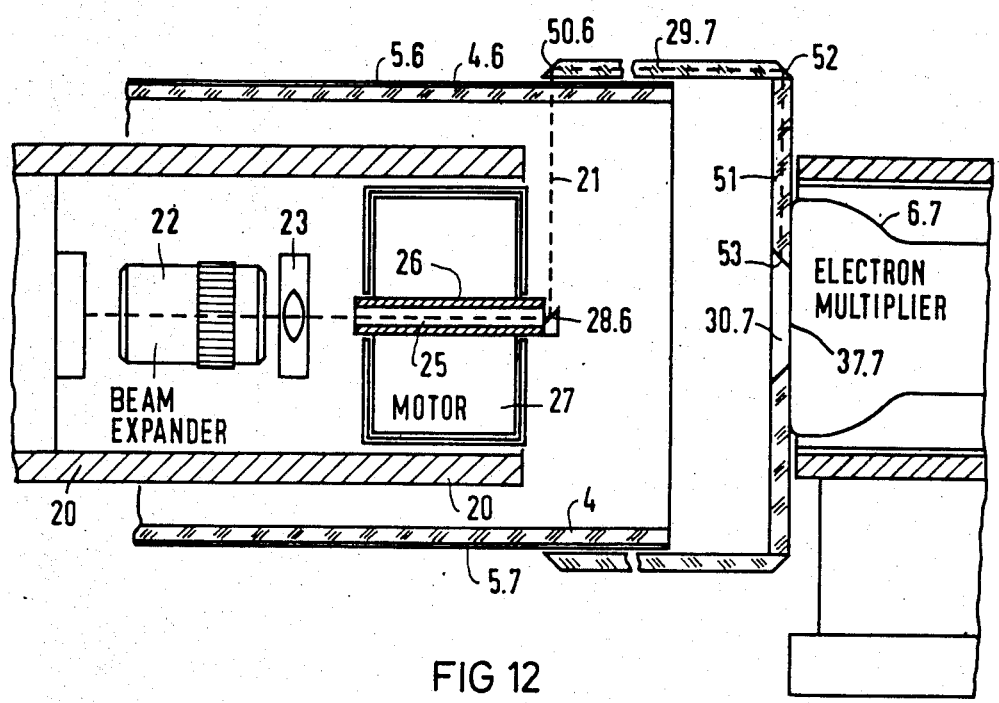
FIG. 12 is a side sectional view of an embodiment of a portion of the apparatus shown in FIG. 1 for use with a small electron multiplier.

FIG. 12 shows an arrangement wherein a small electron multiplier 6.7 is employed. In this embodiment the lightguide 29.7 is terminated by a plate 51 composed of plexiglass. The light triggered in the storage layer 5.6 is conducted to the electron multiplier 6.7 in the lightguide 29.7 via three conical reflective surfaces 50.6, 52 and 53 through a smaller window 30.7 to the cathode 37.7.

Figure 13:
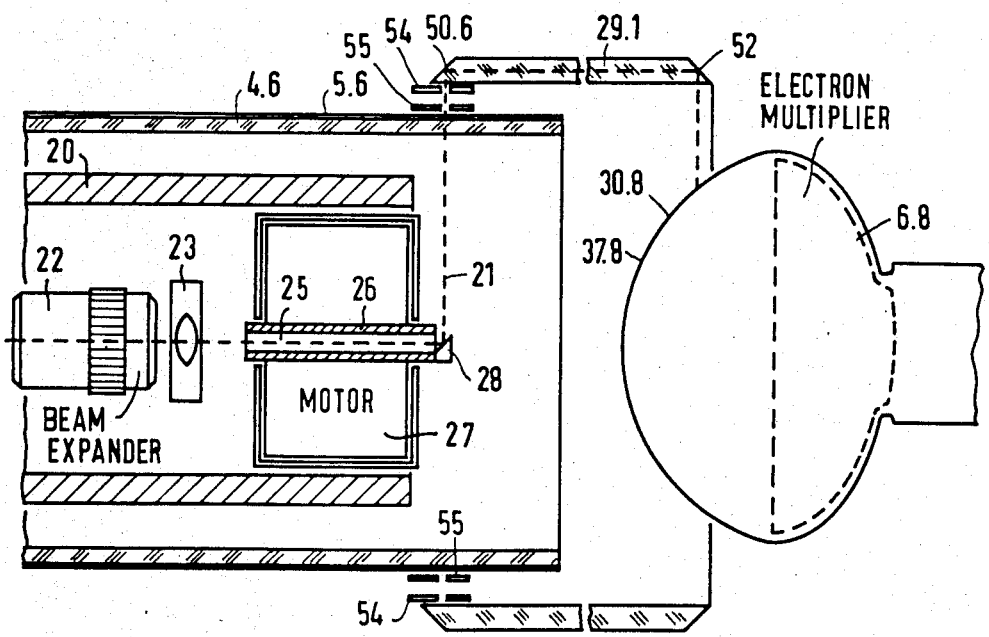
FIG. 13 is a side sectional view of an embodiment of a portion of the apparatus shown in FIG. 1 for use with a hemispherical electron multiplier.

In the arrangement of FIG. 13, the electron multiplier 6.8 has a hemispherical window 30.8 and cathode 37.8. This simplifies the lightguide 29.7 in that only two mirrors 50.6 and 52 are required for transferring the stimulated light. Similar arrangements are achieved with electrode multipliers having cathodes which are referred to as lateral cathodes, i.e., multipliers wherein a planar entrance window is present but wherein the cathode also occupies parts of the cylindrical side wall of the electron multiplier beyond the entrance window.

In the embodiment of FIG. 13, two slit diaphragms 54 and 55 are also situated between the entrance mirror 50.6 and the storage film 5.6 to be stimulated. Thus, only light coming directly through the film 5.6 proceeds into the lightguide 29.7. Stray light is blanked out to an extremely high degree.

Figure 14:
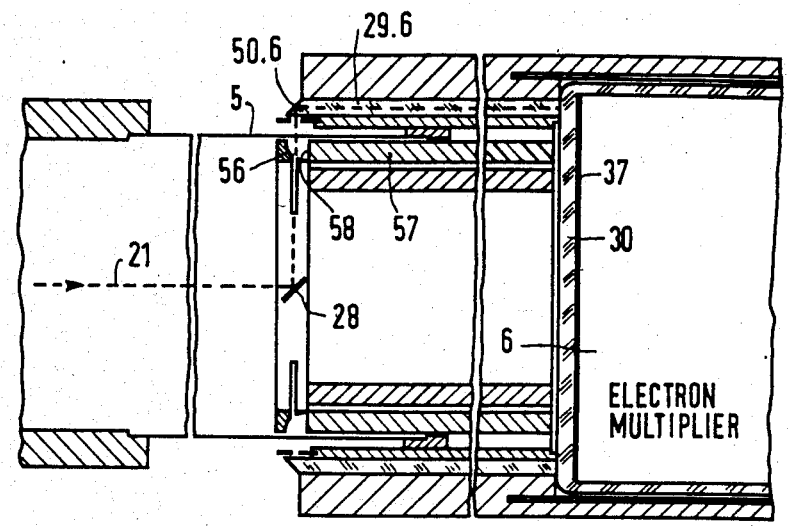
FIG. 14 is a side sectional view of another embodiment of a portion of the apparatus shown in FIG. 1 having two lightguides.
Figure 15:
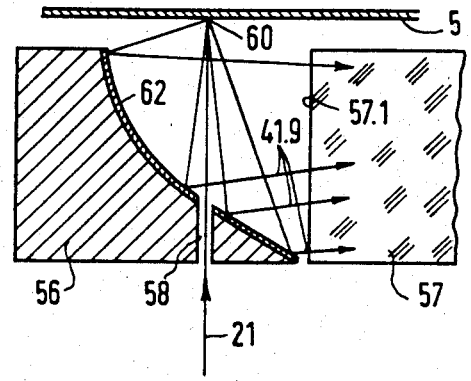
FIG. 15 is an enlarged sectional view of a portion of the apparatus shown in FIG. 14.

FIG. 14 shows an arrangement wherein two mirrors 50.6 and 56 are allocated to the read-out point. The mirror 50.6 is allocated to the lightguide 29.6 and the mirror 56 is allocated to another lightguide 57, both of which lead to the entrance window 30 of the electron multiplier 6. As a result of employing two mirrors 50.6 and 56, over 80% of the light triggered in the storage layer 5 by the read-out beam 21 is captured and conducted to the electron multiplier 6. The arrangement of the mirror 50.6 inclined by 45° is already described in FIG. 12. The mirror 56 a curved shape which is more clearly shown in FIG. 15. As a consequence of the lateral position of the lightguide 57, the incidence of the incoming light 21 onto the entrance surface 57.1 of the lightguide 57 is avoided so that high losses due to reflection are prevented. The light conductor 57 is composed of a quartz tube 10 mm thick which is at a distance of 1.5 mm from the film 5.6. The point of incidence 60 of the scan beam 21 then lies at a distance of 5 mm from the entrance 57.1 of the lightguide 57.

By adding the second reflective surface 50.6 with the lightguide 29.6, all stimulated light except for slight reflection losses (about 4%) can be transmitted to the electron multiplier 6 except for losses which occur due to the slit remaining between the mirrors 50.6 and 56.

The mirror 56 has a ring of transparent material such as glass or plexiglass (surface-mirrored) having a port 58 for the scan beam 21. At its side facing the surface of the film 5.6, the surface is fashioned in the form which, in section, is partly circularly arced, partly planar. The shape is not very critical since all light incident into the lightguide is conducted. Reflection indicated at 41.9 is achieved by a layer 62 which is an aluminum surface mirror of a known type.

The embodiment of FIG. 14 having the two lightguides 29.6 and 57 allows both read-out of images stored in a phosphorescent layer and read-out of film images in transmitted light. Because the intensity of the light of the beam 21 passing through a film is far greater than the light which can be stimulated in the luminophore of a storage film 5.6, it is preferable to make the scan beam 21 weaker when reading film images out. This can be done with a filter, for instance a grey glass. Given the similar placement of a grey glass filter in the beam path of the scan beam 21, the lightguide 29.6 should be covered by a slide when reading out images stored in the phosphorescent material of a storage film 5.6.

Although modifications can be suggested by those skilled in the art, it is the intention of the inventors to embody within the patent warranted hereon all changes and modifications as reasonably and properly come within the scope of their contribution to the art.

We claim as our invention:

1. An apparatus for converting image information into an electrical signal comprising:
   a stationary drum having a radiation-sensitive image storage layer on a longitudinal surface thereof said image storage layer containing image information and emitting radiation corresponding to said information upon stimulation by stimulating radiation;
   multiplier means for converting emitted radiation incident thereon into an electrical signal;
   a rotatable stimulating radiation deflector disposed substantially centrally inside said drum for directing stimulating radiation onto said storage layer, said rotatable radiation deflector and said storage layer being axially displaceable;
   means for conducting said stimulating radiation into an interior of said drum onto said radiation deflector; and
   an emitted radiation-guide disposed between said radiation deflector and said multiplier means for coupling a portion of said radiation emitted by said storage layer to said multiplier means.

2. An apparatus as claimed in claim 1 further comprising means for generating a video signal from said electrical signal connected to an output of said multiplier means.

3. An apparatus as claimed in claim 1 wherein said storage layer is disposed on an interior of said longitudinal surface of said drum.

4. An apparatus as claimed in claim 1 wherein said longitudinal surface of said drum is stimulating radiation-transmissive, and wherein said storage layer is disposed on an exterior of said longitudinal surface.

5. An apparatus as claimed in claim 1 wherein said radiation-guide is a substantially circular plate comprised of emitted radiation-transmissive material disposed substantially perpendicularly with respect to said storage layer.

6. An apparatus as claimed in claim 5 wherein said plate has a substantially annular lateral surface disposed next to said storage layer, and wherein said radiation deflector is disposed in front of said plate in a direction of stimulating radiation propagation for directing said stimulating radiation to a point on said storage layer within an area of said storage layer coextensive with said lateral surface.

7. An apparatus as claimed in claim 6 further comprising:
   means for mounting and rotating said radiation deflector disposed between said radiation deflector and said plate.

8. An apparatus as claimed in claim 5 wherein said plate is also transmissive for said stimulating radiation and wherein said plate has a central opening therein in which said rotatable radiation deflector is disposed for direction stimulating radiation laterally through said plate to said storage layer with said portion of said emitted radiation being radiation reflected from said storage layer back through said plate to said multiplier means.

9. An apparatus as claimed in claim 8 further comprising a calibrator for said multiplier means disposed in said plate.

10. An apparatus as claimed in claim 9 wherein said plate has an off-center recess therein, and wherein said calibrator comprises:
    a reflective surface disposed in the path of emitted radiation in said plate for deflecting said radiation toward said multiplier means.

11. An apparatus as claimed in claim 10 wherein said calibrator further comprises:
    an emitted radiation-blocking layer surrounding said off-center recess having a radiation-admitting opening therein.

12. An apparatus as claimed in claim 10 wherein said calibrator further comprises:

an emitted radiation filter disposed between said reflective surface and said multiplier means.

13. An apparatus as claimed in claim 1 wherein said radiation-guide is a cylinder comprised of emitted radiation-transmissive material concentric with and partially overlapping said longitudinal surface of said drum, and having an emitted radiation-deflecting surface disposed for receiving emitted radiation caused by the stimulating radiation deflected by said rotatable radiation deflector and directing the received emitted radiation through said cylinder toward said mulitiplier means.

14. An apparatus as claimed in claim 13 further comprising:
- a second emitted radiation-guide cylinder disposed insde and substantially concentric with said radiation-guide cylinder with said storage layer being disposed between said radiation-guide cylinders; and
- a further emitted radiation deflecting surface disposed next to and inside of said storage layer for deflecting emitted radiation from said storage layer through said second radiation-guide cylinder toward said multiplier means, said further radiation deflecting surface having a port therein permitting stimulating radiation from said rotatable radiation deflector to pass therethrough substantially unimpeded.

15. An apparatus as claimed in claim 14 wherein said further radiation deflecting surface in cross-section has an arcuate portion and a straight portion.

16. An apparatus as claimed in claim 15 wherein said arcuate portion and said straight portion are separated by said port in cross-section.

17. An apparatus as claimed in claim 13 wherein said longitudinal surface of said drum is comprised of emitted radiation-transmissive material and wherein said storage layer is disposed on an exterior of said longitudinal surface, and wherein said cylinder partially overlaps said exterior of said longitudinal surface.

18. An apparatus as claimed in claim 17 further comprising at least one slit diaphragm disposed between said exterior of said longitudinal surface and said radiation-guide cylinder.

19. An apparatus as claimed in claim 17 wherein said radiation-guide cylinder has a second deflection surface disposed for receiving emitted radiation directed thereon from said radiation deflecting surface and directing said received radiation toward said multiplier means.

20. An apparatus as claimed in claim 19 wherein said multiplier means has a radiation input window extending into said radiation-guide cylinder, and wherein said second radiation deflecting surface of said radiation-guide cylinder directs said received radiation through said radiation input window.

21. An apparatus as claimed in claim 20 wherein said radiation input window of said multiplier means is substantially a hemisphere.

22. An apparatus as claimed in claim 20 further comprising:
- a second emitted radiation-guide disposed between said radiation-guide cylinder and said multiplier means for coupling radiation deflected by said second deflector surface to said multiplier means.

23. An apparatus for converting image information into an electrical signal comprising:
- a stationary drum having a radiation-sensitive image storage layer disposed on an interior of a longitudinal surface thereof, said storage layer containing image information and emitting radiation corresponding to said information upon stimulation by stimulating radiation;
- multiplier means for converting emitted radiation incident thereon into an electrical signal;
- a rotatable stimulating radiation deflector disposed substantially centrally inside said drum for directing stimulating radiation onto said storage layer, said rotatable radiation deflector and said storage layer being axially displaceable;
- means for conducting said stimulating radiation into an interior of said drum onto said rotatable radiation deflector; and
- a substantially circular plate consisting of emitted and stimulated radiation-transmissive material disposed in said drum substantially perpendicularly to said longitudinal surface and having a central opening therein in which said rotatable radiation deflector is disposed such that said stimulating radiation deflected by said rotatable radiation deflector is conducted laterally through said plate to said storage layer and a portion of the emitted radiation from said storage layer is reflected thereby back through said plate and is directed by said plate toward said multiplier means.

24. An apparatus for converting image information into an electrical signal comprising:
- a stationary drum having a radiation-sensitive image storage layer disposed on an interior of a longitudinal surface thereof, said image layer containing image information and emitting radiation corresponding to said information upon stimulation by stimulating radiation;
- multiplier means for converting emitted radiation incident thereon into an electrical signal;
- a rotatable stimulating radiation deflector disposed substantially centrally inside said drum for directing stimulating radiation onto said storage layer, said rotatable radiation deflector and said storage layer being axially displaceable;
- means for conducting said stimulating radiation into an interior of said drum onto said rotable radiation deflector; and
- a plate consisting of emitted radiation-transmissive material disposed substantially perpendicularly in said drum with respect to said storage layer and having a substantially annular lateral surface next to said storage layer, said rotatable radiation deflector being disposed for directing stimulating radiation at a point on said storage layer within an area of said storage layer coextensive with said lateral surface of said plate, said plate conducting emitted radiation reflected by said storage layer through said plate toward said multiplier means.

25. An apparatus as claimed in claim 24 further comprising:
- means for mounting and rotating said rotatable radiation deflector disposed between said rotatable radiation deflector and said plate.

26. An apparatus for converting image information into an electrical signal comprising:
- a stationary drum having a stimulating radiation-transmissive longitudinal surface and a radiation-sensitive image storage layer carried on an exterior of said longitudinal surface said image storage layer containing image information and emitting radiation corresponding to said information upon stimulation by stimulating radiation;

multiplier means for converting emitted radiation incident thereon into an electrical signal;

a rotatable stimulating radiation deflector disposed substantially centrally inside said drum for directing stimulating radiation through said longitudinal surface onto said storage layer;

means for conducting said stimulating radiation into an interior of said drum onto said rotatable radiation deflector; and a cylinder consisting of emitted radiation-transmissive material disposed concentric with and partially overlapping said exterior of said longitudinal surface and having a radiation deflecting surface disposed for receiving emitted radiation caused by stimulating radiation deflected by said rotatable radiation deflector and directing said received emitted radiation toward said multiplier means.

27. An apparatus as claimed in claim 26 further comprising:

at least one slit diaphragm disposed between said storage layer and said radiation deflecting surface.

28. An apparatus as claimed in claim 26 further comprising:

a second radiation deflecting surface carried on said cylinder disposed for receiving emitted radiation deflected by said radiation deflecting surface passing through said cylinder and for directing the received emitted radiation toward said multiplier means.

29. An apparatus as claimed in claim 28 wherein said multiplier means has a radiation input window extending into said cylinder, and wherein said second radiation deflecting surface directs said received radiation into said radiation input window.

30. An apparatus as claimed in claim 28 further comprising:

a plate consisting of emitted radiation-transmissive material disposed between said second radiation deflecting surface and said multiplier means for directly coupling radiation therebetween.

31. An apparatus for converting image information into an electrical signal comprising:

a stationary drum carrying a radiation-sensitive image storage layer on a longitudinal surface thereof, said storage layer containing image information and emitting radiation corresponding to said information upon stimulation by stimulating radiation;

multiplier means for converting emitted radiation incident thereon into an electrical signal;

a rotatable stimulating radiation deflector disposed substantially centrally inside said drum for directing stimulating radiation onto said storage layer;

means for conducting said stimulating radiation into an interior of said drum onto said rotatable radiation deflector;

a first cylinder consisting of emitted radiation-transmissive material concentric with and partially overlapping the exterior of said longitudinal surface and having a radiation deflecting surface disposed for receiving emitted radiation caused by stimulating radiation from said rotatable radiation deflector and directing the received emitted radiation toward said multiplier means;

second cylinder consisting of emitted radiation-transmissive material disposed inside said drum concentric and substantially coextensive with said first cylinder; and a further emitted radiation deflecting surface disposed for deflecting emitted radiation reflected by said storage layer through said second cylinder toward said multiplier means, said further radiation deflecting surface having a port therein permitting substantially unimpeded passage of stimulating radiation therethrough.

32. An apparatus as claimed in claim 31 wherein said further radiation deflecting surface in cross-section has an arcuate portion and a straight portion.

33. An apparatus as claimed in claim 32 wherein said port separates said arcuate portion from said straight portion in cross-section.

* * * * *